US009023173B2

(12) United States Patent
Kurimura et al.

(10) Patent No.: US 9,023,173 B2
(45) Date of Patent: May 5, 2015

(54) METHOD OF PROCESSING TRANSLUCENT RIGID SUBSTRATE LAMINATE, AND PROCESS OF MANUFACTURING PLATE-SHAPED PRODUCT EMPLOYING THE METHOD

(75) Inventors: Hiroyuki Kurimura, Shibukawa (JP); Hayato Miyazaki, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 129 days.

(21) Appl. No.: 13/990,212

(22) PCT Filed: Nov. 25, 2011

(86) PCT No.: PCT/JP2011/077237
§ 371 (c)(1),
(2), (4) Date: May 29, 2013

(87) PCT Pub. No.: WO2012/073833
PCT Pub. Date: Jun. 7, 2012

(65) Prior Publication Data
US 2013/0248104 A1 Sep. 26, 2013

(30) Foreign Application Priority Data

Nov. 30, 2010 (JP) .................................. 2010-266781

(51) Int. Cl.
| | |
|---|---|
| B32B 37/12 | (2006.01) |
| B32B 7/12 | (2006.01) |
| C08L 75/16 | (2006.01) |
| C08G 18/67 | (2006.01) |
| C08G 18/75 | (2006.01) |
| B32B 17/10 | (2006.01) |

(52) U.S. Cl.
CPC . *B32B 7/12* (2013.01); *B32B 37/12* (2013.01); *B32B 2307/414* (2013.01); *B32B 2310/0806* (2013.01); *B32B 2457/20* (2013.01); *B32B 2457/208* (2013.01); *C08L 75/16* (2013.01); *B32B 2309/02* (2013.01); *B32B 2309/04* (2013.01); *B32B 2315/08* (2013.01); *B32B 2333/04* (2013.01); *C08G 18/672* (2013.01); *C08G 18/755* (2013.01); *B32B 17/10036* (2013.01); *B32B 17/10706* (2013.01)
USPC .................................................... 156/275.5

(58) Field of Classification Search
CPC ........ B32B 37/12; B32B 7/12; C08G 18/755; C08G 18/672; C08G 18/42; C08L 75/16
USPC ..................... 156/272.2, 275.5, 710
See application file for complete search history.

(56) References Cited

U.S. PATENT DOCUMENTS

| | | | | |
|---|---|---|---|---|
| 2010/0000670 A1* | 1/2010 | Kurimura et al. | ............. | 156/247 |
| 2010/0012263 A1 | 1/2010 | Oshima et al. | ................ | 156/247 |

FOREIGN PATENT DOCUMENTS

| | | |
|---|---|---|
| JP | 11-71553 | 3/1999 |
| JP | 2000-169166 | 6/2000 |
| JP | 2001-226641 | 8/2001 |
| JP | 2004-186201 | 7/2004 |
| JP | 2006-341564 | 12/2006 |
| JP | 2009-256125 | 11/2009 |
| JP | 2009256125 A * | 11/2009 |
| JP | 2010-18505 | 1/2010 |
| JP | 2010-95627 | 4/2010 |
| WO | WO 2010/010900 | 1/2010 |

OTHER PUBLICATIONS

Patent Cooperation Treaty, Notification of Transmittal of Translation of the International Preliminary Report on Patentability, mailed Jun. 26, 2013, for corresponding International Patent Application No. PCT/JP2011/077237.
Chinese Office Action issued on Aug. 26, 2014, issued to the corresponding Chinese Application No. 201180057145.X.
International Search Report for PCT/JP2011/077237; mailed Jan. 10, 2012; 4 pages.

* cited by examiner

*Primary Examiner* — Daniel McNally
(74) *Attorney, Agent, or Firm* — Stein IP, LLC

(57) ABSTRACT

Provided is a method of processing a translucent rigid substrate laminate, whereby it becomes possible to maintain peeling properties and good appearance of the translucent rigid substrate laminate during the processing of the translucent rigid substrate laminate even when a process such as transportation and storage is included in the method. The method of processing a translucent rigid substrate laminate comprises a step 1 for producing a translucent rigid substrate laminate in which at least two translucent rigid substrates are bonded to each other with a photocurable adhering agent; a step 2 for maintaining the translucent rigid substrate laminate, which has been produced in step 1 or which has been subjected to a shape processing subsequent to step 1, under predetermined temperature management conditions and transporting and/or storing the translucent rigid substrate laminate while maintaining the translucent rigid substrate laminate under the above-mentioned conditions; and a step 3 for peeling the translucent rigid substrate laminate which has been subjected to the shape processing or has not been subjected to the shape processing subsequent to step 2.

20 Claims, No Drawings

METHOD OF PROCESSING TRANSLUCENT RIGID SUBSTRATE LAMINATE, AND PROCESS OF MANUFACTURING PLATE-SHAPED PRODUCT EMPLOYING THE METHOD

CROSS-REFERENCE TO RELATED APPLICATIONS

This application is a national stage application of PCT Application No. PCT/JP2011/077237, filed Nov. 25, 2011, which claims the benefit of Japanese Application No. 2010-266781, filed Nov. 30, 2010, in the Japanese Intellectual Property Office, the disclosures of which are incorporated herein by reference.

BACKGROUND OF THE INVENTION

1. Field of the Invention

The present invention relates to a method of processing a translucent rigid substrate laminate, more specifically, to a method of processing a translucent rigid substrate laminate including transportation and/or storage. Moreover, the present invention relates to a process of manufacturing a plate-shaped product employing the method.

2. Description of the Related Art

In display unit of various electronic devices such as a television, a notebook computer, a car navigation, an electronic calculator, a mobile phone, an electronic notebook, and a PDA (Personal Digital Assistant), displays such as a liquid crystal display (LCD), an organic EL display (OELD), an electroluminescence display (ELD), a field emission display (FED), and a plasma display (PDP) are used. In addition, a plate glass product for protection is generally placed to cover such a display element in order to protect the display element.

The plate glass product is obtained by processing plate glass to have a size and shape which are suitable for each display unit, and it is necessary to process a large amount of plate glass products with high production efficiency in order to meet market requirements for a certain price level.

Thus, a method for enhancing the production efficiency of plate glass products has been proposed in Japanese Laid-Opened Patent Publication No. 2009-256125 (Patent Document 1). Specifically, "a method for processing plate glass including: forming a material glass block (A) by laminating a plurality of material glass plates (1) and integrally adhering the respective material glass plates (1) by a releasable adhering material (2) which is interposed between the respective material glass plates (1); forming divided glass blocks (B) with a small area by dividing the material glass block (A) in a planer direction; forming glass block products (C) with a product shape in a planar view by processing at least an outer circumference of the divided glass blocks (B); and individually separating the glass block products (C) after processing an end surface of the glass block products (C)" has been proposed (Claim 1). Patent Literature 1 discloses that according to the above configuration "it is possible to obtain a plurality of plate glass products in the smaller number of processes and achieve high productivity since division, outline processing, and end surface processing are performed in a state where the plurality of material glass plates are laminated" (paragraph [0007]).

In addition, Patent Document 1 discloses that "the adhering material (2) interposed between the respective material glass plates (1) is a photocurable liquid-form adhering material, which cures when irradiated with an ultraviolet ray, the state of which is softened by increasing a temperature" (Claim 4).

Patent Document 1 discloses that according to the configuration "the liquid-form adhering agent spreads to form a film with a uniform thickness over the entire surface between the upper and lower material glass plates when the photocurable adhering agent is interposed between the upper and lower material glass plates and pressure is applied thereon in the vertical direction, and if irradiation with an infrared ray is performed thereon in this state, the liquid-form adhering agent which has spread to form a film cures, and the upper and lower glass plates are integrally adhered. Therefore, it is possible to quickly, precisely, and integrally adhere the plurality of material glass plates by the laminating. In addition, if the product glass block is accommodated in hot water or the like, and the temperature is raised after final processing (end surface processing), the adhering agent which has cured between the respective glass plates is softened and separated into films. Therefore, collection and treatment of the adhering agent are facilitated without causing environmental contamination." (paragraph [0007]).

On the other hand, Japanese Laid-Opened Patent Publication No. 2010-95627 (Patent Document 2) describes a photocurable adhesive composition for temporary fixing that is suitable for protecting a processed member from scratches and contamination during transportation. It is described that the composition contains (A) a polyfunctional (meth)acrylate, (B) a monofunctional (meth)acrylate and (C) a photopolymerization initiator, and the glass transition temperature of a cured body is −50° C. to 40° C. Further, Example 14 of Patent Document 2 describes that a plate glass laminate which is adhesively fixed using the adhesive composition is processed, transported 120 km, and then, immersed in warm water at 80° C. to peel the laminate. The invention described in Patent Document 2 is advantageous as a transportation method after a process of a glass display panel unit of a mobile phone.

PRIOR ART DOCUMENT

Patent Document

Patent Document 1: Japanese Laid-Opened Patent Publication No. 2009-256125
Patent Document 2: Japanese Laid-Opened Patent Publication No. 2010-95627

SUMMARY OF THE INVENTION

According to the method of processing a plate glass in Patent Document 1, a plate glass product having a predetermined shape can be manufactured with a high production efficiency. However, it is necessary for the plate glass, to be subjected to plural processing steps to finally form the plate glass into a plate glass product, and these steps are not necessarily performed in the same factory and further, not necessarily continuously performed. For example, it can be considered that a step of laminating a plate glass may be performed in one factory and the laminated plate glass may be transported to another factory to be subjected to shape processing. In addition, it can be considered that even when all steps are performed in the same factory, the plate glass product may be stored for a predetermined period until a subsequent step is performed after the laminating step ends. Furthermore, it can be considered that the laminating step and shape processing step may be performed in one factory and the peeling step may be performed in another factory.

The adhesive composition in Patent Document 2 is suitable for transportation or storage of the laminate. However, the present invention and not Patent Document 2 describes that even when being immersed in warm water after transportation and storage, the laminate is peeled off or easily peeled off. In addition, the present invention and not Patent Document 2 describes that the cured adhesive composition is not discolored during transportation and storage, and there is no trace of reattachment so that the laminate has good appearance.

The present invention provides a method of processing a translucent rigid substrate laminate capable of maintaining peeling properties and good appearance during the processing of the translucent rigid substrate laminate such as a glass block even when a step such as transportation and storage is included.

The present inventors have intensively studied to solve the aforementioned problems, and found that the environment during transportation and storage has influence on peeling properties and appearance change, and that peeling properties and appearance can be maintained by means of transportation and storage in a predetermined environment.

In an aspect of the present invention which is completed based on the above findings, there is provided a method of processing a translucent rigid substrate laminate including:

a step 1 for producing a translucent rigid substrate laminate in which at least two translucent rigid substrates are bonded to each other with a photocurable adhering agent;

a step 2 for maintaining the translucent rigid substrate laminate, which has been produced in step 1 or which has been subjected to shape processing subsequent to step 1, under the following temperature management conditions and transporting and/or storing the translucent rigid substrate laminate while maintaining the translucent rigid substrate laminate under the conditions of 1) 10 hours to 4 weeks when the translucent rigid substrate laminate is maintained at a management temperature lower than a glass transition temperature of a cured body of the photocurable adhering agent by 0° C. or more and less than 5° C., 2) 10 hours to 6 weeks when the translucent rigid substrate laminate is maintained at a management temperature lower than the glass transition temperature of a cured body of the photocurable adhering agent by 5° C. or more and less than 10° C., and 3) 10 hours to 8 weeks when the translucent rigid substrate laminate is maintained at a management temperature lower than a glass transition temperature of a cured body of the photocurable adhering agent by 10° C. or more; and a step 3 for peeling the translucent rigid substrate laminate which has been subjected to the shape processing or has not been subjected to the shape processing subsequent to step 2.

In an embodiment of the method of processing a translucent rigid substrate laminate of the present invention, an amount of light irradiation to cure the adhering agent every time the translucent rigid substrates are bonded in step 1 is 100 to 10,000 mJ/cm$^2$.

In another embodiment of the method of processing a translucent rigid substrate laminate of the present invention, light irradiation is performed on the translucent rigid substrate laminate before the peeling in step 3 subsequent to the step 2 to cure the adhering agent.

In still another embodiment of the method of processing a translucent rigid substrate laminate of the present invention, the translucent rigid substrate is a plate glass.

In still another embodiment of the method of processing a translucent rigid substrate laminate of the present invention, the adhering agent contains (A) a polyfunctional (meth)acrylate, (B) a monofunctional (meth)acrylate, and (C) a photopolymerization initiator.

In still another embodiment of the method of processing a translucent rigid substrate laminate of the present invention, the adhering agent contains (D) a particulate matter.

In still another embodiment of the method of processing a translucent rigid substrate laminate of the present invention, the adhering agent contains (E) a polymerization inhibitor.

In another aspect of the present invention, there is provided a process of manufacturing a plate-shaped product using the method of processing a translucent rigid substrate laminate according to the present invention.

According to the present invention, since it is possible to process the translucent rigid substrate laminate at different places depending on steps or store the translucent rigid substrate laminate until a proper time, for example, an effect of increasing the degree of freedom in a production method when the plate glass product is industrially mass-produced can be obtained.

In addition, effects of contributing to space-saving and protecting a bonding surface from scratches, dust and dirt can be also obtained by transportation and storage of the translucent rigid substrate in a laminated state.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, embodiments of the present invention will be described in detail.

<Step 1. Preparation of Translucent Rigid Substrate Laminate>

A translucent rigid substrate composing a translucent rigid substrate laminate is not particularly limited and examples thereof may include a plate glass (a reinforced plate glass, a material plate glass, a glass substrate with a transparent conductive film, a glass substrate on which an electrode or a circuit is formed, and the like), a sapphire substrate, a quartz substrate, a plastic substrate, and a magnesium fluoride substrate. The size of one translucent rigid substrate is not particularly limited and the translucent rigid substrate typically has an area of about 10,000 to 250,000 mm$^2$ and a thickness of about 0.1 to 2 mm. Generally, the translucent rigid substrates to be laminated each have the same size. The translucent rigid substrate laminate is obtained by laminating two or more translucent rigid substrates, from the viewpoint of production efficiency, five or more substrates are preferable, and about 10 to 30 translucent rigid substrates are more preferably laminated using a photocurable adhering agent.

While here is no limitation, a predetermined printing pattern or plating pattern for exhibiting any one of the functions of the plate-shaped product can be attached to the surface of each translucent rigid substrate. Examples of the printing pattern may include a design of a display screen of a mobile phone, and examples of the plating pattern may include a rotary encoder where a metal wiring pattern such as Al or AlNd and a chrome plating pattern is formed.

The photocurable adhering agent has properties that the adhering agent is cured by irradiation of light such as UV rays and softened by heating at a high temperature. Generally, irradiation light is UV rays, but there is no limitation thereto. Irradiation light may be appropriately changed according to properties of an adhering agent to be used. For example, microwaves, infrared rays, visible rays, UV rays, X-rays, γ-rays, electron beams and the like can be irradiated. Therefore, in the present invention, light refers not only to visible rays but also to electromagnetic waves (energy rays) including a wide wavelength region.

The translucent rigid substrate laminate can be formed by, for example, bonding each translucent rigid substrate in which a photocurable adhering agent is applied on one or both bonding surfaces and then, radiating light that cures the adhering agent interposed and spreading between both translucent rigid substrates. This operation is repeated a desired number of times so that a translucent rigid substrate laminate in which a desired number of translucent rigid substrates are laminated can be produced.

At this time, when the light irradiation is too strong, the peeling properties and appearance of the translucent rigid substrate laminate easily deteriorate with time, and when the light irradiation is too weak, the curing of the adhering agent is not sufficient. Therefore, every time the translucent rigid substrates are bonded, an amount of light irradiation to cure the adhering agent is preferably 1,000 to 10,000 mJ/cm$^2$, more preferably 1,200 to 6,000 mJ/cm$^2$, and still more preferably 1,500 to 3,000 mJ/cm$^2$. The irradiation time is preferably 10 to 200 seconds and more preferably 20 to 100 seconds.

Any known photocurable adhering agent can be used as a photocurable adhering agent and the photocurable adhering agent is not particularly limited. As described in Japanese Laid-Opened Patent Publication No. 10-95627, examples of the photocurable adhering agent appropriately used may include an adhesive composition containing (A) a polyfunctional (meth)acrylate, (B) a monofunctional (meth)acrylate and (C) a photopolymerization initiator.

As (A) a polyfunctional (meth)acrylate, polyfunctional (meth)acrylate oligomer/polymers having two or more (meth)acryloyl groups at an end or side chain of the oligomer/polymer, and polyfunctional (meth)acrylate monomers having two or more (meth)acryloyl groups may be used. Examples of the polyfunctional (meth)acrylate oligomer/polymer may include 1,2-polybutadiene terminated urethane (meth)acrylate (for example, "TE-2000" and "TEA-1000" available from Nippon Soda Co., Ltd.), a hydrogenated product thereof (for example, "TEAI-1000" available from Nippon Soda Co., Ltd.), 1,4-polybutadiene terminated urethane (meth)acrylate (for example, "BAC-45" available from Osaka Organic Chemical Industry Ltd.), polyisoprene terminated (meth)acrylate and polyester type urethane (meth)acrylate (for example, "UV-2000B", "UV-3000B" and "UV-7000B" available from The Nippon Synthetic Chemical Industry Co., Ltd., and "KHP-11" and "KHP-17" available from Negami Chemical Industrial Co., Ltd.), polyether type urethane (meth)acrylate (for example, "UV-3700B" and "UV-6100B" available from The Nippon Synthetic Chemical Industry Co., Ltd.), and bisphenol A type epoxy (meth)acrylate.

Among them, polyester type urethane (meth)acrylate and/or polyether type urethane (meth)acrylate are preferable, and polyester type urethane (meth)acrylate is more preferable from the viewpoint of high effectiveness.

Here, urethane (meth)acrylate is urethane (meth)acrylate which can be obtained by reacting a polyol compound (hereafter, represented by X), an organic polyisocyanate compound (hereafter, represented by Y) and a hydroxy(meth)acrylate (hereafter, represented by Z).

Examples of the polyol compound (X) include polyols such as ethylene glycol, diethylene glycol, triethylene glycol, tetraethylene glycol, polyethylene glycol, propylene glycol, dipropylene glycol, polypropylene glycol, butylene glycol, 1,4-butanediol, polybutylene glycol, 1,5-pentanediol, 1,6-hexanediol, 1,8-octanediol, 1,9-nonanediol, 3-methyl-1,5-pentanediol, 2,4-diethyl-1,5-pentanediol, 2,2-butylethyl-1,3-propanediol, neopentyl glycol, cyclohexane dimethanol, hydrogenated bisphenol A, polycaprolactone, trimethylolethane, trimethylolpropane, polytrimethylolpropane, pentaerythritol, polypentaerythritol, sorbitol, mannitol, glycerine, polyglycerine and polytetramethylene glycol; polyether polyols having at least one structure of polyethylene oxide, polypropylene oxide, ethylene oxide/propylene oxide block or random copolymers; polyester polyols which are condensation products of the polyols or polyether polyols with polybasic acids such as maleic anhydride, maleic acid, fumaric acid, itaconic acid anhydride, itaconic acid, adipic acid and isophthalic acid; caprolactone-modified polyols such as caprolactone-modified polytetramethylene polyol; polyolefin type polyols; polycarbonate type polyols; polydiene polyols such as polybutadiene polyol, polyisoprene polyol, hydrogenated polybutadiene polyol and hydrogenated polyisoprene polyol; and silicone polyols such as polydimethyl siloxane polyol. Among them, polyether polyols and/or polyester polyols are more preferable.

The organic polyisocyanate compound (Y) does not need to be particularly limited and aromatic, aliphatic, cycloaliphatic, and alicyclic polyisocyanates can be used. Among them, polyisocyanates such as tolylene diisocyanate (TDI), diphenylmethane diisocyanate (MDI), hydrogenated diphenylmethane diisocyanate (H-MDI), polyphenylmethane polyisocyanate (crude MDI), modified diphenylmethane diisocyanate (modified MDI), hydrogenated xylylene diisocyanate (H-XDI), xylylene diisocyanate (XDI), hexamethylene diisocyanate (HMDI), trimethylhexamethylene diisocyanate (TMXDI), tetramethylxylylene diisocyanate (m-TMXDI), isophorone diisocyanate (IPDI), norbornane diisocyanate (NBDI), and 1,3-bis(isocyanatomethyl)cyclohexane (H6XDI), and trimer compounds of these polyisocyanates, reaction products of the polyisocyanates and polyols are preferably used. Among these, hydrogenated xylylene diisocyanate (H-XDI) and/or isophorone diisocyanate (IPDI) are preferable.

Examples of the hydroxy(meth)acrylate (Z) include 2-hydroxyethyl (meth)acrylate, 2-hydroxypropyl (meth)acrylate, 2-hydroxybutyl (meth)acrylate, 2-hydroxyethyl acryloyl phosphate, 4-hydroxybutyl (meth)acrylate, 2-(meth)acryloyloxyethyl-2-hydroxypropyl phthalate, glycerin di(meth)acrylate, 2-hydroxy-3-acryloyloxypropyl (meth)acrylate, caprolactone-modified 2-hydroxyethyl (meth)acrylate, pentaerythritol tri(meth)acrylate, dipentaerythritol penta(meth)acrylate and caprolactone-modified 2-hydroxyethyl (meth)acrylate. Among them, one or more kinds from the group consisting of 2-hydroxyethyl (meth)acrylate, 2-hydroxypropyl (meth)acrylate and 2-hydroxybutyl (meth)acrylate are preferable.

The weight average molecular weight of the polyfunctional (meth)acrylate oligomer/polymer is preferably 7,000 to 60,000 and more preferably 13,000 to 40,000. In the examples, the weight average molecular weight was obtained by using tetrahydrofuran as a solvent and preparing calibration curves with commercially available standard polystyrene by means of a GPC system (manufactured by TOSOH CORPORATION, SC-8010) under the following conditions.
Flow rate: 1.0 ml/min
Preset temperature: 40° C.
Column structure: three columns in total (theoretical step number 32,000 steps in total) composed of one column of "TSK guard column MP (xL)" 6.0 mm ID×4.0 cm manufactured by Tosoh Corporation and two columns of "TSK-GEL MULTIPORE HXL-M", 7.8 mm ID×30.0 cm (theoretical step number 16,000 steps) manufactured by Tosoh Corporation
Amount of sample charged: 100 µl (sample solution concentration 1 mg/ml)
Pressure of charging solution: 39 kg/cm$^2$
Detector: RI detector Examples of the bifunctional (meth)acrylate monomer may include 1,3-butylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dicyclopentanyl di(meth)acrylate, 2-ethyl-2-butylpropanediol di(meth)acrylate, neopentyl glycol-modified trimethyloipropane di(meth)acrylate, stearic acid-modified pentaerythritol di(meth)acrylate, polypropylene glycol di(meth)acrylate, 2,2-bis(4-(meth)acryloxydiethoxyphenyl)propane, 2,2-bis(4-(meth)acryloxypropoxyphenyl)propane and 2,2-bis(4-(meth)acryloxytetraethoxyphenyl)propane. Among them, from the viewpoint of high effectiveness, 1,6-hexanediol di(meth)acrylate and/or dicyclopentanyl di(meth)acrylate are preferable and dicyclopentanyl di(meth)acrylate is more preferable.

Examples of the trifunctional (meth)acrylate monomer may include trimethyloipropane tri(meth)acrylate and tris[(meth)acryloxyethyl]isocyanurate. Among them, from the viewpoint of high effectiveness, trimethylolpropane tri(meth)acrylate is more preferable.

Examples of tetrafunctional or higher (meth)acrylate monomers include dimethylolpropane tetra(meth)acrylate, pentaerythritol tetra(meth)acrylate, pentaerythritol ethoxy tetra(meth)acrylate, dipentaerythritol penta(meth)acrylate and dipentaerythritol hexa(meth)acrylate.

Among the polyfunctional (meth)acrylates, from the viewpoint of high effectiveness, one or more kinds from the group consisting of polyfunctional (meth)acrylate oligomers/polymers, bifunctional (meth)acrylate monomers and trifunctional (meth)acrylate monomers are preferable. Two or more kinds from the group consisting of polyfunctional (meth)acrylate oligomers/polymers, bifunctional (meth)acrylate monomers and/or trifunctional (meth)acrylate monomers are more preferably used in combination.

When a polyfunctional (meth)acrylate oligomer/polymer, a bifunctional (meth)acrylate monomer and/or a trifunctional (meth)acrylate monomer are used in combination, the content ratio thereof is preferably polyfunctional (meth)acrylate oligomer/polymer:bifunctional (meth)acrylate monomer and trifunctional (meth)acrylate monomer=10 to 90:90 to 10, more preferably 25 to 75:75 to 25, most preferably 30 to 70:70 to 30 in terms of a mass ratio, based on 100 parts by mass of the total content of the polyfunctional (meth)acrylate oligomer/polymer, bifunctional (meth)acrylate monomer and/or trifunctional (meth)acrylate monomer.

The (A) polyfunctional (meth)acrylate is preferably hydrophobic. The hydrophobic polyfunctional (meth)acrylate refers to a (meth)acrylate not having a hydroxyl group. When the polyfunctional (meth)acrylate is water-soluble, a cured body of the composition swells to cause misalignment during cutting processing and there is a concern of deteriorating processing precision. Therefore, the water-soluble polyfunctional (meth)acrylate is not preferable. However, a hydrophilic polyfunctional (meth)acrylate may be used as long as the cured body of the composition thereof does not significantly swell or partially dissolve in water.

Examples of the (B) monofunctional (meth)acrylate monomer include methyl (meth)acrylate, ethyl (meth)acrylate, propyl (meth)acrylate, butyl (meth)acrylate, 2-ethylhexyl (meth)acrylate, isooctyl (meth)acrylate, isodecyl (meth)acrylate, lauryl (meth)acrylate, stearyl (meth)acrylate, phenyl (meth)acrylate, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, methoxylated cyclodecatriene (meth)acrylate, 2-hydroxyethyl (meth)acrylate, 2-hydroxypropyl (meth)acrylate, 3-hydoxypropyl (meth)acrylate, 4-hydroxybutyl (meth)acrylate, tetrahydrofurfuryl (meth)acrylate, 2-hydroxy-3-phenoxypropyl (meth)acrylate, glycidyl (meth)acrylate, caprolactone-modified tetrahydrofurfuryl (meth)acrylate, 3-chloro-2-hydroxypropyl (meth)acrylate, N,N-dimethylaminoethyl (meth)acrylate, N,N-diethylaminoethyl (meth)acrylate, t-butylaminoethyl (meth)acrylate, ethoxycarbonylmethyl (meth)acrylate, phenol ethylene oxide-modified (meth)acrylate, phenol (2 mol ethylene oxide-modified) (meth)acrylate, phenol (4 mol ethylene oxide-modified) (meth)acrylate, paracumylphenol ethylene oxide-modified (meth)acrylate, nonylphenol ethylene oxide-modified (meth)acrylate, nonylphenol (4 mol ethylene oxide-modified) (meth)acrylate, nonylphenol (8 mol ethylene oxide-modified) (meth)acrylate, nonylphenol (2.5 mol propylene oxide-modified) (meth)acrylate, 2-ethylhexylcarbitol (meth)acrylate, ethylene oxide-modified phthalic acid (meth)acrylate, ethylene oxide-modified succinic acid (meth)acrylate, trifluoroethyl (meth)acrylate, acrylic acid, methacrylic acid, ω-carboxy-polycaprolactone mono(meth)acrylate, phthalic acid monohydroxyethyl (meth)acrylate, (meth)acrylic acid dimer, β-(meth)acryloyloxyethyl hydrogen succinate, n-(meth)acryloyl oxyalkylhexahydrophthalimide, 2-(1,2-cyclohexacarboxyimide)ethyl (meth)acrylate, ethoxyethylene glycol di(meth)acrylate and benzyl (meth)acrylate. In addition, maleic acid and fumaric acid can be used.

Among the monofunctional (meth)acrylates, from the viewpoint of high effectiveness, one or more kinds from the group consisting of phenol 2 mol ethylene oxide-modified (meth)acrylate, 2-(1,2-cyclohexacarboxyimide)ethyl (meth)acrylate and 2-hydroxy-3-phenoxypropyl (meth)acrylate are preferable. Phenol 2 mol ethylene oxide-modified (meth)acrylate, 2-(1,2-cyclohexacarboxyimide) ethyl(meth)acrylate and/or 2-hydroxy-3-phenoxypropyl (meth)acrylate are more preferably used in combination.

When the phenol 2 mol ethylene oxide-modified (meth)acrylate, 2-(1,2-cyclohexacarboxyimide)ethyl (meth)acrylate and/or 2-hydroxy-3-phenoxypropyl (meth)acrylate are used in combination, the content ratio thereof is preferably phenol (2 mol ethylene oxide-modified) (meth)acrylate:2-(1,2-cyclohexacarboxyimide)ethyl (meth)acrylate and/or 2-hydroxy-3-phenoxypropyl (meth)acrylate=5 to 80:95 to 20, more preferably 15 to 60:85 to 40, and most preferably 20 to 45:80 to 55 in terms of a mass ratio, based on 100 parts by mass of the total content of phenol (2 mol ethylene oxide-modified) (meth)acrylate, 2-(1,2-cyclohexacarboxyimide) ethyl (meth)acrylate and/or 2-hydroxy-3-phenoxypropyl (meth)acrylate.

The (B) monofunctional (meth)acrylate is more preferably hydrophobic as (A). Hydrophobic monofunctional (meth)acrylate refers to a (meth)acrylate not having a hydroxyl group. When the monofunctional (meth)acrylate is water-soluble, a cured body of the composition swells to cause misalignment during cutting processing and there is a concern of deteriorating processing precision. Therefore, the water-soluble monofunctional (meth)acrylate is not preferable. However, a hydrophilic monofunctional (meth)acrylate may be used as long as the cured body of the composition thereof does not significantly swell or partially dissolve in water.

The amount of (A) polyfunctional (meth)acrylate used is preferably 5 to 95 parts by mass, more preferably 15 to 60 parts by mass and most preferably 20 to 50 parts by mass based on 100 parts by mass of the total content of (A) and (B). When the amount used is 5 parts by mass or more, during the immersion of the cured body of the composition in warm water, the properties that the cured body is peeled off (hereafter, referred to as "peeling properties") are sufficiently encouraged by adherends, and the cured body of the composition can be peeled off in a film shape. When the amount used is 95 parts by mass or less, there is no concern of a reduction in initial adhesion properties.

The (C) photopolymerization initiator is blended in order to promote photocuring of the resin composition by increasing sensitivity by activated rays such as visible rays or UV rays, and various kinds of known photopolymerization initiators can be used. Specific examples thereof may include benzophenone or a derivative thereof; benzil or a derivative thereof; anthraquinone or a derivative thereof; benzoin; a benzoin derivative such as benzoin methyl ether, benzoin ethyl ether, benzoin propyl ether and benzoin isobutyl ether, benzyl dimethyl ketal; an acetophenone derivative such as diethoxyacetophenone and 4-t-butyltrichloroacetophenone; 2-dimethylaminoethyl benzoate; p-dimethylaminoethyl benzoate; diphenyl disulfide; thioxanthone or a derivative thereof; camphorquinone; a camphorquinone derivative such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethyl ester, 7,7-dimethyl-2,3-dioxobicyclo[2.2.1]heptane-1-carboxy-2-methyl ester and 7,7-dimethyl-2,3-dioxobicyclo[2.2.1]heptane-1-carboxylic acid chloride; a α-aminoalkylphenone derivative such as 2-methyl-1-[4-methylthio)phenyl]-2-morpholinopropan-1-one and 2-benzyl-2-dimethyl amino-1-(4-morpholinophenyl)-butanone-1; an acylphosphine oxide derivative such as benzoyldiphenylphosphine oxide, 2,4,6-trimethylbenzoyldiphenylphosphine oxide, benzoyldiethoxyphosphine oxide, 2,4,6-trimethylbenzoyldimethoxyphenylphosphine oxide and 2,4,6-trimethylbenzoyldiethoxyphenylphosphine oxide; oxyphenyl-acetic acid 2-[2-oxo-2-phenyl-acetoxy-ethoxy]-ethyl ester and/or oxy-phenyl-acetic acid 2-[2-hydroxy-ethoxy]-ethyl ester. The photopolymerization initiator may be used alone or in combination of two or more kinds thereof. Among them, in view of high effectiveness, it is preferable to use one or two or more kinds from the group consisting of benzyl dimethyl ketal, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

The content of (C) photopolymerization initiator is preferably 0.1 to 20 parts by mass and more preferably 0.5 to 10 parts by mass based on 100 parts by mass of the total content of (A) and (B). When the content is 0.1 parts by mass or more, a curing promotion effect may be reliably obtained. When the content is 20 parts by mass or less, a sufficient curing speed can be obtained. Addition of component (C) in a content of 1 part by mass or more is more preferable in that curing can be performed irrespective of the amount of light irradiation, and the degree of crosslinking of a cured body of the composition is increased, thereby suppressing misalignment and the like during cutting processing and improving peeling properties.

The total mass of the components (A), (B) and (C) is preferably 90% by mass or more in the adhesive composition, typically can be 95% by mass or more and can be 98% by mass or more from the viewpoint of peeling properties.

It is preferable that the photocurable adhering agent include a particulate matter (D) that is not dissolved in any components of (A), (B) and (C) of the adhering agent. Therefore, the adhering agent after curing can be maintained at a constant thickness, and thus a processing precision is improved. Further, from the viewpoint that line expansion coefficients of the cured body of the adhering agent and the particulate matter (D) are different from each other, peeling properties are improved when peeling is performed after the translucent rigid substrate is bonded by using the adhering agent.

Any one of generally used organic particles or inorganic particles may be used as the material of the particulate matter (D). Specifically, examples of the organic particles may include polyethylene particles, polypropylene particles, crosslinked polymethylmethacrylate particles and crosslinked polystyrene particles. Examples of the inorganic particles may include ceramic particles such as glass, silica, alumina and titanium.

It is preferable that the particulate matter (D) have a sphere shape from the viewpoint of improvement of processing precision, that is, control of the film thickness of an adhesive. It is preferable that an average particle size of the particulate matter (D) by a laser method be in the range of 20 to 200 μm. When the average particle size of the particulate matter is less than 20 μm, peeling properties deteriorate, and when the average particle size is 200 μm or more, misalignment easily occurs when a temporarily fixed member is processed and a dimensional precision deteriorates. From the viewpoint of the peeling properties and the dimensional precision, the average particle size (D50) is preferably 35 μm to 150 μm and more preferably 50 to 120 μm. A particle size distribution is measured by a laser diffraction type particle size distribution measurement device.

The amount of the particulate matter (D) used is preferably 0.01 to 20 parts by mass, more preferably 0.05 to 10 parts by mass and most preferably 0.1 to 6 parts by mass based on 100 parts by mass of the total amount of (A) and (B), from the viewpoint of adhesion properties, processing precision and peeling properties.

A polymerization inhibitor (E) can be added to the photocurable adhering agent to improve storage stability. Examples of the polymerization inhibitor include methylhydroquinone, hydroquinone, 2,2-methylene-bis(4-methyl-6-tertiarybutylphenol), catechol, hydroquinone monomethyl ether, monotertiarybutylhydroquinone, 2,5-ditertiarybutylhydroquinone, p-benzoquinone, 2,5-diphenyl-p-benzoquinone, 2,5-ditertiarybutyl-p-benzoquinone, picric acid, citric acid, phenothiazine, tertiarybutylcatechol, 2-butyl-4-hydroxyanisole and 2,6-ditertiarybutyl-p-cresol.

The amount of the polymerization inhibitor (E) used is preferably 0.001 to 3 parts by mass and more preferably 0.01 to 2 parts by mass based on 100 parts by mass of the total amount of (A) and (B). When the amount used is 0.001 parts by mass or more, storage stability is ensured, and when the amount used is 3 parts by mass or less, good adhesion properties are obtained and uncuring does not occur.

The photocurable adhering agent may contain various elastomers such as acrylic rubber, urethane rubber or an acrylonitrile-butadiene-styrene rubber, or an additive such as an inorganic filler, a solvent, a bulking agent, a reinforcing material, a plasticizer, a thickener, a dye, a pigment, a flame retardant, a silane coupling agent, a polar organic solvent or a surfactant, in the range of not impairing the object of the present invention.

It is preferable that the glass transition temperature of the cured body after the adhering agent is photocured be −50° C. to 50° C. From the viewpoint of peeling properties and dimensional precision, the glass transition temperature is preferably −20° C. to 45° C., more preferably 0° C. to 40° C. and most preferably 10° C. to 35° C. When the glass transition temperature of the cured body is in the above range, during the immersion of the translucent rigid substrate laminate in warm water for peeling, the cured body of the adhering agent itself thermally expands so that a bonding area is decreased and adhesive strength is decreased. Therefore, the cured body of the adhering agent is easily peeled off in a film shape from the translucent rigid substrate laminate. When the glass transition temperature of the cured body of the adhering agent is −50° C. or more, misalignment does not easily occur during the processing of the temporarily fixed member and dimensional precision is excellent. When the glass transition temperature is 50° C. or less, peeling properties are improved.

For example, the glass transition temperature of a cured body can be adjusted using the following method. In order to increase the glass transition temperature, there is a method of increasing the content of (A) polyfunctional (meth)acrylate, reducing the content of (C) photopolymerization initiator, selecting a (A) polyfunctional (meth)acrylate having a large number of functional groups and selecting a (A) polyfunctional (meth)acrylate and (B) monofunctional (meth)acrylate in which the glass transition temperature of each of cured bodies thereof is high. Reversely, in order to reduce the glass transition temperature, there is a method of reducing the content of (A) polyfunctional (meth)acrylate, selecting a (A) polyfunctional (meth)acrylate having a small number of functional groups, increasing the content of (C) photopolymerization initiator and selecting a (A) polyfunctional (meth)acrylate and (B) monofunctional (meth)acrylate in which the glass transition temperature of each of cured bodies thereof is low. In the present invention, the glass transition temperature is measured by a DMA (dynamic viscoelastic measurement) method.

<Step 2. Transportation and/or Storage of Translucent Rigid Substrate Laminate>

Next, after being subjected to shape processing as necessary, the translucent rigid substrate laminate obtained by Step 1 is transported and stored. During the transportation and/or storage, it is important to manage the translucent rigid substrate laminate under predetermined temperature conditions so that the peeling properties and appearance of the adhering agent are not changed. Since the deterioration in the peeling properties and appearance becomes remarkable particularly when the laminate is exposed to a higher temperature than the glass transition temperature of the cured body of the photocurable adhering agent, the laminate is preferably maintained at a management temperature lower than the glass transition temperature of the cured body of the photocurable adhering agent by 0° C. or more, more preferably at a management temperature lower than the glass transition temperature of the cured body of the photocurable adhering agent by 5° C. or more, and still more preferably at a management temperature lower than the glass transition temperature of the cured body of the photocurable adhering agent by 10° C. or more. Since internal stress is not easily released by managing the laminate at a temperature lower than the glass transition temperature, it is difficult to cause a reattachment phenomenon which will be described later. The lower the management temperature, the more advantageous in terms of transportation and storage for a long period of time. Accordingly, the lower limit of the management temperature is not limited. However, since the management at a temperature lower than necessary just for transportation and storage in a short period of time causes cost increase and a storage effect becomes saturated, typically, the laminate is maintained at a management temperature lower than the glass transition temperature of the cured body of the photocurable adhering agent by 10° C. or more and 20° C. or less, and more typically at a management temperature lower than the glass transition temperature of the cured body of the photocurable adhering agent by 15° C. or more and 20° C. or less.

When the laminate is maintained under the temperature condition lower than the glass transition temperature of the cured body of the photocurable adhering agent by 0° C. or more and less than 5° C., and when a period required for transportation and/or storage is more than 4 weeks, there is a remarkable negative impact on peeling properties and appearance of the adhering agent, and thus, the maximum transportation and/or storage period is preferably 4 weeks. On the other hand, when a transportation and/or storage period is less than 10 hours, even when temperature management is not strict, there is no significant change in properties of the adhering agent. Therefore, the necessity for such temperature management is low.

Therefore, during transportation and/or storage, the appropriate temperature management conditions of the translucent rigid substrate laminate are as follows:

1) 10 hours to 4 weeks when the translucent rigid substrate laminate is maintained at the management temperature lower than the glass transition temperature of the cured body of the photocurable adhering agent by 0° C. or more and less than 5° C.;

2) 10 hours to 6 weeks when the translucent rigid substrate laminate is maintained at the management temperature lower than the glass transition temperature of the cured body of the photocurable adhering agent by 5° C. or more and less than 10° C.; and 3) 10 hours to 8 weeks when the translucent rigid substrate laminate is maintained at the management temperature lower than the glass transition temperature of the cured body of the photocurable adhering agent by 10° C. or more.

Shape processing is not particularly limited, and examples thereof are as follows.

First, there is shape processing in which the translucent rigid substrate laminate is divided in a thickness direction, and the divided translucent rigid substrate laminates are formed in a desired number. The division method is not particularly limited, and examples thereof may include a method of performing division in rectangular parallelepiped forms having the same size as one another by using a disk cutter (diamond disk and cemented carbide disk), a fixed abrasive type or loose abrasive type wire saw, a laser beam, etching (for example: chemical etching or electrolytic etching using hydrofluoric acid, sulfuric acid or the like), a water jet and red heat zone (a nichrome wire) alone or in combination thereof. The etching can be used in surface treatment of a cut surface after the division.

In addition, there is shape processing which is performed on each of the divided translucent rigid substrate laminates. In this step, since each of the divided translucent rigid substrate laminates can be integrally processed in a form of a target plate-shaped product, there is an advantage in that a production speed of the plate-shaped product may be significantly increased. The shape processing may be performed by any known means, and examples thereof may include grinding by a rotation whetstone, holing by an ultrasonic wave vibration drill, end surface processing by a rotation brush, holing by etching, end surface processing by etching, external shape processing by etching and flame processing using a burner. The processing method may be used alone or in combination. The etching may be used in surface treatment after the shape processing.

The above-described various shape processing can be appropriately performed before and after transportation and/or storage, and there is no limitation thereto. For example, there are a pattern in which after the step 1 of preparing a translucent rigid substrate laminate, the translucent rigid substrate laminate is transported to another factory to perform shape processing and a peeling step, a pattern in which after the step 1 of preparing a translucent rigid substrate laminate, the translucent rigid substrate laminate is subjected to shape processing immediately or after storage for a predetermined period, stored for a predetermined period, and then, transported to another factory to perform a peeling step, a pattern in which after the step 1 of preparing a translucent rigid substrate laminate, the translucent rigid substrate laminate is subjected to shape processing and a peeling step after storage for a predetermined time, and a pattern in which after the step 1 of preparing a translucent rigid substrate laminate, the translucent rigid substrate laminate is subjected to shape processing immediately or after storage for a predetermined period, transported to another factory and further subjected to shape processing to perform a peeling step.

<Step 3. Peeling of Translucent Rigid Substrate Laminate>

After step 2, the translucent rigid substrates bonded by heating the translucent rigid substrate laminate after the shape processing are peeled off and thus, plural plate-shaped products are obtained. The heating method is not particularly limited, but a method of immersing the translucent rigid substrate laminate after the shape processing in warm water is preferable, since the adhering agent is softened in a film shape and smoothly separated from each plate-shaped product. The appropriate temperature of warm water depends on the adopted adhering agent, but the temperature is preferably 40 to 90° C., more preferably 60 to 90° C. and still more preferably 80 to 90° C. In theory, the temperature has to be a temperature equal to or higher than the glass transition temperature of a cured body of an adhering agent, preferably a temperature higher than a glass transition temperature by 20° C. or more, more preferably a temperature higher than a glass transition temperature by 40° C. or more, and still more preferably a temperature higher than a glass transition temperature by 60° C. or more. When the warm water having a predetermined temperature is used, a cured body of an adhering agent thermally expands in a short period of time, and internal stress generated when the adhering agent is cured is released. At this time, a wavy or three-dimensional deformation is generated at the interface of the translucent rigid substrate and the adhering agent, a decrease in a bonding area is achieved to decrease adhesive strength, and the cured body of the composition in a film shape can be removed.

The theory is not intended to limit the present invention. However, when the laminate is exposed to a high temperature before a peeling step, a residual distortion stress is not released, and then, a reattachment phenomenon occurs in a state in which the residual distortion is released. Therefore, an energy required for delaminating the adhesive is no longer obtained despite heating for peeling, which makes the peeling difficult.

In step 3, before the peeling operation, in order to regenerate internal stress, the translucent rigid substrate laminate may be irradiated with light to cure the adhering agent. Accordingly, the reduced peeling properties are recovered. At this time, when the light irradiation is too weak, internal stress cannot be regenerated and peeling properties are not recovered. Meanwhile, when the light irradiation is too strong, there is a possibility of deteriorating the translucent rigid substrate. Therefore, the amount of light irradiation is preferably 2,000 to 12,000 mJ/cm$^2$, more preferably 2,500 to 10,000 mJ/cm$^2$, still more preferably 3,000 to 9,000 mJ/cm$^2$, and most preferably 5,000 to 8,500 mJ/cm$^2$.

EXAMPLES

In order to understand more clearly the present invention and advantages, the following examples will be provided, but the present invention is not limited to the examples. As in the examples, it is clarified that the laminate is maintained under predetermined temperature management conditions so that peeling properties and good appearance can be maintained.

Example 1

1. Preparation of Photocurable Adhering agent

The photocurable adhering agent was prepared by mixing the following components (A) to (E):

As (A) the polyfunctional (meth)acrylates, 20 parts by mass of "UV-3000B" available from The Nippon Synthetic Chemical Industry Co., Ltd. (urethane acrylate, hereinafter abbreviated as "UV-3000B", weight average molecular weight 18,000, a polyol compound is polyester polyol, an organic polyisocyanate compound is isophorone diisocyanate, and hydroxyl(meth)acrylate is 2-hydroxyethyl acrylate) and 15 parts by mass of dicyclopentanyl diacrylate ("KAYARAD R-684" available from Nippon Kayaku Co., Ltd., hereinafter abbreviated as "R-684");

As (B) the monofunctional (meth)acrylates, 50 parts by mass of 2-(1,2-cyclohexacarboxyimide)ethyl acrylate ("ARONIX M-140" available from TOAGOSEI CO., LTD., hereinafter abbreviated as "M-140") and 15 parts by mass of phenol 2 mol ethylene oxide-modified acrylate ("ARONIX M-101A" available from TOAGOSEI CO., LTD.);

As (C) the photopolymerization initiator, 10 parts by mass of benzyl dimethyl ketal ("IRGACURE 651" available from BASF Company Ltd., hereinafter abbreviated as "BDK");

As (D) the particulate matter, 1 part by mass of spherical crosslinked polystyrene particles with an average particle size of 100 μm ("GS-100S" available from GANZ CHEMICAL CO., LTD.); and As (E) the polymerization inhibitor, 0.1 parts by mass of 2,2-methylene-bis(4-methyl-6-tertiarybutylphenol) ("Sumilizer MDP-S" available from Sumitomo Chemical Company, Limited, hereinafter abbreviated as "MDP").

2. Preparation of Plate Glass Laminate

As the translucent rigid substrate, two plate glasses (width 530 mm×length 420 mm×thickness 0.7 mm) were prepared, and bonded through the photocurable adhering agent to prepare a plate glass laminate. Specifically, after 40 g of the photocurable adhering agent was applied to the first plate glass, the second plate glass was bonded on the first plate glass and UV irradiation was performed from the surface side of the second plate glass to cure the photocurable adhering agent. UV irradiation amounts were each of 6,000 mJ/cm$^2$ (measured by a cumulative illuminometer using a light receptor of 365 nm, UV irradiation time 80 seconds) and 3,000 mJ/cm$^2$ (measured by a cumulative illuminometer using a light receptor of 365 nm, UV irradiation time 40 seconds) or the UV irradiation amount was 1,500 mJ/cm² (measured by a cumulative illuminometer using a light receptor of 365 nm, UV irradiation time 20 seconds).

3. Appearance and Peeling Property Evaluation after Temperature Management of Plate Glass Laminate The obtained plate glass laminate was stored in a dark room for various time-periods under the temperature conditions in Table 1, and then, appearance and peeling property evaluation was performed. In the Table, there is an "initial stage" in each item of maintenance time (management time) and maintenance temperature (management temperature). The "initial stage" refers to a state immediately after the plate glass laminate was prepared, and irradiated with UV rays to cure the photocurable adhering agent.

The appearance was evaluated visually in terms of the color tone of the plate glass laminate plates immediately after the lamination and the presence of reattachment traces. The reattachment traces were observed as white. The appearance was evaluated in four grades.

There were few changes of appearance: 1
Appearance was discolored, but there were few reattachment traces: 2
Appearance was discolored, and there were some reattachment traces: 3
Appearance was discolored, and there were many reattachment traces: 4

The laminate having peeling properties was immersed in warm water (80° C.). The time from the immersion in warm water (80° C.) to natural peeling of the plate glass was measured (80° C. warm water peeling time) for peeling properties. When the plate glass was not peeled off after 60 minutes, the evaluation was "not peeled". The results are shown in Tables 1-1 to 1-3. Respectively, Table 1-1 shows results of the UV irradiation amount of 1,500 mJ/cm², and Table 1-2 shows results of the UV irradiation amount of 3,000 mJ/cm², and Table 1-3 shows results of the UV irradiation amount of 6,000 mJ/cm².

4. Measurement of Glass Transition Temperature

A silicon sheet having a thickness of 1 mm was interposed between PET films as a form, and the adhering agent was cured from the upper surface by a curing apparatus using an electrodeless discharge lamp manufactured by Fusion UV Systems Inc. under the conditions of an accumulated quantity of light of 2,000 mJ/cm² at a wavelength of 365 nm and then, further cured from the bottom under the conditions of an accumulated quantity of light of 2,000 mJ/cm² at a wavelength of 365 nm to prepare a cured body of the adhering agent having a thickness of 1 mm. The prepared cured body was cut into a size of length 50 mm×width 5 mm by a cutter to form a cured body for glass transition temperature measurement. Using a dynamic viscoelasticity measuring device "DMS-210" manufactured by Seiko Instruments Inc., the obtained cured body was heated at a rate of temperature increase of 2° C./min with stress and distortion applied in a tensile direction at 1 Hz in a nitrogen atmosphere while tan δ was measured. The temperature of the peak top of tan δ was set as a glass transition temperature.

As a result, the glass transition temperature was 26° C.

TABLE 1-1

UV irradiation: 1500 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| Initial stage | Appearance | — | — | — | — | — | — | — | — | — | — | — |
| | Peeling time (min) | 5 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 7 | 5 | 5 | 5 | 5 | 5.5 | 6 | 6 | 7 | 8 |
| 5° C. | Appearance | — | 1 | 1 | 1 | 1 | 1 | 1 | 1 | 1 | 1 | 1 |
| | Peeling time (min) | — | 4.5 | 4.5 | 4 | 3.5 | 4 | 5.5 | 6 | 7 | 8 | 9 |
| 10° C. | Appearance | — | 1 | 1 | 1 | 1 | 1 | 1 | 1 | 1 | 1 | 1 |
| | Peeling time (min) | — | 4 | 4.5 | 4 | 5.5 | 5.5 | 5.5 | 5 | 7 | 9 | 9 |
| 15° C. | Appearance | — | 1 | 1 | 1 | 1 | 1 | 1 | 1 | 1 | 1 | 1 |
| | Peeling time (min) | — | 4 | 4 | 4 | 5.5 | 5.5 | 5.5 | 5 | 8 | 9 | 9 |
| 23° C. | Appearance | — | 1 | 1 | 1 | 1 | 1 | 1 | 1 | 1 | 2 | 3 |
| | Peeling time (min) | — | 3.5 | 4 | 4 | 5.5 | 5.5 | 5.5 | 6.5 | 8 | 11 | 50 |
| 30° C. | Appearance | — | 1 | 1 | 1 | 2 | 2 | 2 | 3 | 3 | 4 | 4 |
| | Peeling time (min) | — | 4 | 4 | 4 | 5.5 | 6.5 | 8 | 12 | 22 | Not peeled | Not peeled |
| 40° C. | Appearance | — | 1 | 1 | 2 | 2 | 3 | 3 | 3 | 4 | 4 | 4 |
| | Peeling time (min) | — | 5.5 | 4 | 4.5 | 5.5 | 7.5 | 13 | 25 | Not peeled | Not peeled | Not peeled |
| 50° C. | Appearance | — | 1 | 2 | 2 | 4 | 4 | 4 | 4 | 4 | 4 | 4 |
| | Peeling time (min) | — | 7 | 5 | 17.5 | Not peeled | Not peeled | Not peeled | Not peeled | Not peeled | Not peeled | Not peeled |
| 60° C. | Appearance | — | 1 | 3 | 4 | 4 | 4 | 4 | 4 | 4 | 4 | 4 |
| | Peeling time (min) | — | 9 | 10.5 | Not peeled | Not peeled | Not peeled | Not peeled | Not peeled | Not peeled | Not peeled | Not peeled |

TABLE 1-2

UV irradiation: 3000 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| Initial stage | Appearance | — | — | — | — | — | — | — | — | — | — | — |
| | Peeling time (min) | 1.5 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 1.5 | 1 | 1 | 1 | 1 | 1 | 1 | 1 | 1 | 1 |

TABLE 1-2-continued

UV irradiation: 3000 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| 5° C. | Appearance | — | 1 | 1 | 1 | 1 | 1 | 1 | 1 | 1 | 1 | 1 |
| | Peeling time (min) | — | 1 | 1 | 1 | 1 | 1 | 1 | 1 | 1 | 1 | 1 |
| 10° C. | Appearance | — | 1 | 1 | 1 | 1 | 1 | 1 | 1 | 1 | 1 | 1 |
| | Peeling time (min) | — | 1 | 1 | 1 | 1 | 1 | 0.5 | 0.5 | 1 | 1 | 1 |
| 15° C. | Appearance | — | 1 | 1 | 1 | 1 | 1 | 1 | 1 | 1 | 1 | 1 |
| | Peeling time (min) | — | 1 | 1 | 1 | 0.5 | 0.5 | 0.5 | 0.5 | 1 | 2 | 1 |
| 23° C. | Appearance | — | 1 | 1 | 1 | 1 | 1 | 1 | 1 | 2 | 3 | 4 |
| | Peeling time (min) | — | 1 | 1 | 1 | 1 | 1.5 | 1.5 | 1.5 | 4 | 60 | Not peeled |
| 30° C. | Appearance | — | 1 | 1 | 1 | 2 | 3 | 4 | 4 | 4 | 4 | 4 |
| | Peeling time (min) | — | 0.5 | 1 | 1 | 1 | 45 | Not peeled | Not peeled | Not peeled | Not peeled | Not peeled |
| 40° C. | Appearance | — | 1 | 1 | 3 | 3 | 3 | 4 | 4 | 4 | 4 | 4 |
| | Peeling time (min) | — | 1 | 1 | 1.5 | 20 | 60 | Not peeled | Not peeled | Not peeled | Not peeled | Not peeled |
| 50° C. | Appearance | — | 1 | 2 | 3 | 3 | 4 | 4 | 4 | 4 | 4 | 4 |
| | Peeling time (min) | — | 1.5 | 3 | 20 | 55 | Not peeled | Not peeled | Not peeled | Not peeled | Not peeled | Not peeled |
| 60° C. | Appearance | — | 1 | 2 | 3 | 4 | 4 | 4 | 4 | 4 | 4 | 4 |
| | Peeling time (min) | — | 2 | 15 | 60 | Not peeled | Not peeled | Not peeled | Not peeled | Not peeled | Not peeled | Not peeled |

TABLE 1-3

UV irradiation: 6000 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| Initial stage | Appearance | — | — | — | — | — | — | — | — | — | — | — |
| | Peeling time (min) | 0.5 | — | — | — | — | — | — | — | — | — | — |
| −20° C. | Appearance | — | 1 | 1 | 1 | 1 | 1 | 1 | 1 | 1 | 1 | 2 |
| | Peeling time (min) | — | 1 | 1 | 0.5 | 0.5 | 1 | 1 | 1 | 1 | 1 | 1 |
| 5° C. | Appearance | — | 1 | 1 | 1 | 1 | 1 | 1 | 1 | 1 | 1 | 2 |
| | Peeling time (min) | — | 1 | 1 | 1 | 1 | 1 | 0.5 | 0.5 | 0.5 | 0.5 | 0.5 |
| 10° C. | Appearance | — | 1 | 1 | 1 | 1 | 1 | 1 | 1 | 1 | 1 | 2 |
| | Peeling time (min) | — | 0.5 | 0.5 | 1 | 1 | 1 | 1 | 1 | 1 | 1 | 1 |
| 15° C. | Appearance | — | 1 | 1 | 1 | 1 | 1 | 1 | 1 | 1 | 1 | 2 |
| | Peeling time (min) | — | 0.5 | 0.5 | 1 | 1 | 1 | 1 | 1 | 1.5 | 3 | 9.5 |
| 23° C. | Appearance | — | 1 | 1 | 1 | 1 | 1 | 1 | 1 | 2 | 4 | 4 |
| | Peeling time (min) | — | 0.5 | 0.5 | 1 | 1 | 1 | 1 | 1.5 | 1.5 | Not peeled | Not peeled |
| 30° C. | Appearance | — | 1 | 1 | 1 | 3 | 4 | 4 | 4 | 4 | 4 | 4 |
| | Peeling time (min) | — | 0.5 | 0.5 | 1.5 | 40 | Not peeled | Not peeled | Not peeled | Not peeled | Not peeled | Not peeled |
| 40° C. | Appearance | — | 1 | 1 | 3 | 4 | 4 | 4 | 4 | 4 | 4 | 4 |
| | Peeling time (min) | — | 1 | 1.5 | 55 | Not peeled | Not peeled | Not peeled | Not peeled | Not peeled | Not peeled | Not peeled |
| 50° C. | Appearance | — | 1 | 4 | 4 | 4 | 4 | 4 | 4 | 4 | 4 | 4 |
| | Peeling time (min) | — | 1 | Not peeled | Not peeled | Not peeled | Not peeled | Not peeled | Not peeled | Not peeled | Not peeled | Not peeled |
| 60° C. | Appearance | — | 1 | 4 | 4 | 4 | 4 | 4 | 4 | 4 | 4 | 4 |
| | Peeling time (min) | — | 1 | Not peeled | Not peeled | Not peeled | Not peeled | Not peeled | Not peeled | Not peeled | Not peeled | Not peeled |

5. UV Reirradiation Test

Here, the laminate maintained with the UV irradiation amount of 3,000 mJ/cm² during curing at 30° C. for 2 weeks was not peeled off in the peeling test, but the laminate was naturally peeled off in 1 minute in the peeling test performed after UV reirradiation with the UV irradiation amount of 7,500 mJ/cm² (measured by a cumulative illuminometer using a light receptor of 365 nm, UV irradiation time 94 seconds).

Example 2

The preparation of plate glass laminate, appearance and peeling property evaluation after temperature management of plate glass laminate and measurement of glass transition temperature were conducted as in Example 1 except that a photocurable adhering agent having the following components was used. The glass transition temperature of the adhering agent was 16° C. The results are shown in Tables 2-1 to 2-3. Respectively, Table 2-1 shows results of the UV irradiation amount of 1,500 mJ/cm², and Table 2-2 shows results of the UV irradiation amount of 3,000 mJ/cm², and Table 2-3 shows results of the UV irradiation amount of 6,000 mJ/cm².

Composition of Photocurable Adhering Agent in Example 2:

As (A) the polyfunctional (meth)acrylates, 20 parts by mass of "UV-3000B" available from The Nippon Synthetic Chemical Industry Co., Ltd. (urethane acrylate, hereinafter abbreviated as "UV-3000B") and 10 parts by mass of 1,6-hexanediol diacrylate ("Light Acrylate 1,6-HX-A" available from Kyoeisha Chemical Co., Ltd., hereinafter abbreviated as "1,6-HX-A");

As (B) the monofunctional (meth)acrylates, 40 parts by mass of 2-(1,2-cyclohexacarboxyimide)ethyl acrylate ("ARONIX M-140" available from TOAGOSEI CO., LTD., hereinafter abbreviated as "M-140") and 30 parts by mass of phenol 2 mol ethylene oxide-modified acrylate ("ARONIX M-101A" available from TOAGOSEI CO., LTD.);

As (C) the photopolymerization initiator, 10 parts by mass of benzyl dimethyl ketal ("IRGACURE 651" available from BASF Company Ltd., hereinafter abbreviated as "BDK");

As (D) the particulate matter, 1 part by mass of spherical crosslinked polystyrene particles with an average particle size of 100 μm ("GS-100S" available from GANZ CHEMICAL CO., LTD.); and As (E) the polymerization inhibitor, 0.1 parts by mass of 2,2-methylene-bis(4-methyl-6-tertiarybutylphenol) ("Sumilizer MDP-S" available from Sumitomo Chemical Company, Limited, hereinafter abbreviated as "MDP").

TABLE 2-1

UV irradiation: 1500 mJ/cm$^2$

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| Initial stage | Appearance | — | — | — | — | — | — | — | — | — | — | — |
| | Peeling time (min) | 4 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 3 | 3.5 | 4 | 4.5 | 5 | 5 | 5 | 5 | 5 | 6 |
| 5° C. | Appearance | — | 1 | 1 | 1 | 1 | 1 | 1 | 1 | 1 | 1 | 1 |
| | Peeling time (min) | — | 4 | 4.5 | 6 | 6 | 6 | 6 | 6 | 6 | 6 | 6.5 |
| 10° C. | Appearance | — | 1 | 1 | 1 | 1 | 1 | 1 | 1 | 1 | 1 | 3 |
| | Peeling time (min) | — | 4 | 5 | 6 | 6 | 6 | 6 | 6 | 6 | 7 | 35 |
| 15° C. | Appearance | — | 1 | 1 | 1 | 1 | 1 | 1 | 1 | 1 | 3 | 4 |
| | Peeling time (min) | — | 4 | 5 | 6 | 8 | 10 | 10 | 10 | 15 | 20 | Not peeled |
| 23° C. | Appearance | — | 1 | 1 | 1 | 2 | 3 | 4 | 4 | 4 | 4 | 4 |
| | Peeling time (min) | — | 5 | 5 | 6 | 9 | 20 | Not peeled | Not peeled | Not peeled | Not peeled | Not peeled |
| 30° C. | Appearance | — | 1 | 1 | 1 | 2 | 3 | 4 | 4 | 4 | 4 | 4 |
| | Peeling time (min) | — | 5 | 5 | 7 | 10 | 50 | Not peeled | Not peeled | Not peeled | Not peeled | Not peeled |
| 40° C. | Appearance | — | 1 | 1 | 2 | 3 | 4 | 4 | 4 | 4 | 4 | 4 |
| | Peeling time (min) | — | 5 | 5 | 11 | 50 | Not peeled | Not peeled | Not peeled | Not peeled | Not peeled | Not peeled |
| 50° C. | Appearance | — | 2 | 2 | 3 | 4 | 4 | 4 | 4 | 4 | 4 | 4 |
| | Peeling time (min) | — | 10 | 15 | 55 | Not peeled | Not peeled | Not peeled | Not peeled | Not peeled | Not peeled | Not peeled |
| 60° C. | Appearance | — | 2 | 3 | 4 | 4 | 4 | 4 | 4 | 4 | 4 | 4 |
| | Peeling time (min) | — | 20 | 45 | Not peeled | Not peeled | Not peeled | Not peeled | Not peeled | Not peeled | Not peeled | Not peeled |

TABLE 2-2

UV irradiation: 3000 mJ/cm$^2$

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| Initial stage | Appearance | — | — | — | — | — | — | — | — | — | — | — |
| | Peeling time (min) | 1 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 1.5 | 1 | 1 | 1 | 1 | 1 | 1 | 1 | 1 | 1 |
| 5° C. | Appearance | — | 1 | 1 | 1 | 1 | 1 | 1 | 1 | 1 | 1 | 1 |
| | Peeling time (min) | — | 1 | 1 | 1 | 1 | 1 | 1 | 1 | 1 | 1 | 1.5 |
| 10° C. | Appearance | — | 1 | 1 | 1 | 1 | 1 | 1 | 1 | 1 | 2 | 4 |
| | Peeling time (min) | — | 1 | 0.5 | 0.5 | 1 | 1 | 1 | 1 | 1 | 2 | Not peeled |
| 15° C. | Appearance | — | 1 | 1 | 1 | 1 | 1 | 1 | 1 | 2 | 4 | 4 |
| | Peeling time (min) | — | 1 | 0.5 | 0.5 | 1 | 1 | 1 | 1 | Not peeled | Not peeled | Not peeled |
| 23° C. | Appearance | — | 1 | 1 | 1 | 1 | 2 | 3 | 4 | 4 | 4 | 4 |
| | Peeling time (min) | — | 1 | 1 | 2 | 2 | 14 | 55 | Not peeled | Not peeled | Not peeled | Not peeled |
| 30° C. | Appearance | — | 1 | 1 | 1 | 2 | 3 | 4 | 4 | 4 | 4 | 4 |
| | Peeling time (min) | — | 1 | 1 | 2 | 13 | 50 | Not peeled | Not peeled | Not peeled | Not peeled | Not peeled |
| 40° C. | Appearance | — | 1 | 1 | 1 | 4 | 4 | 4 | 4 | 4 | 4 | 4 |
| | Peeling time (min) | — | 1 | 30 | Not peeled | Not peeled | Not peeled | Not peeled | Not peeled | Not peeled | Not peeled | Not peeled |
| 50° C. | Appearance | — | 2 | 3 | 4 | 4 | 4 | 4 | 4 | 4 | 4 | 4 |
| | Peeling time (min) | — | 15 | 60 | Not peeled | Not peeled | Not peeled | Not peeled | Not peeled | Not peeled | Not peeled | Not peeled |

TABLE 2-2-continued

UV irradiation: 3000 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| 60° C. | Appearance | — | 3 | 4 | 4 | 4 | 4 | 4 | 4 | 4 | 4 | 4 |
| | Peeling time (min) | — | 50 | Not peeled | Not peeled | Not peeled | Not peeled | Not peeled | Not peeled | Not peeled | Not peeled | Not peeled |

TABLE 2-3

UV irradiation: 6000 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| Initial stage | Appearance | — | — | — | — | — | — | — | — | — | — | — |
| | Peeling time (min) | 1 | — | — | — | — | — | — | — | — | — | — |
| −20° C. | Appearance | — | 1 | 1 | 1 | 1 | 1 | 1 | 1 | 1 | 1 | 2 |
| | Peeling time (min) | — | 1 | 1 | 1 | 1 | 1 | 1 | 1 | 1 | 1 | 1 |
| 5° C. | Appearance | — | 1 | 1 | 1 | 1 | 1 | 1 | 1 | 1 | 1 | 2 |
| | Peeling time (min) | — | 1 | 1 | 1 | 1 | 1 | 0.5 | 0.5 | 0.5 | 1 | 1 |
| 10° C. | Appearance | — | 1 | 1 | 1 | 1 | 1 | 1 | 1 | 1 | 2 | 4 |
| | Peeling time (min) | — | 1 | 1 | 1 | 1 | 0.5 | 0.5 | 1 | 1 | 2 | Not peeled |
| 15° C. | Appearance | — | 1 | 1 | 1 | 1 | 1 | 1 | 1 | 2 | 4 | 4 |
| | Peeling time (min) | — | 1.5 | 1 | 1 | 1 | 0.5 | 1.5 | 1 | 1 | Not peeled | Not peeled |
| 23° C. | Appearance | — | 1 | 1 | 1 | 1 | 3 | 4 | 4 | 4 | 4 | 4 |
| | Peeling time (min) | — | 1.5 | 1.5 | 1.5 | 3 | 2 | Not peeled | Not peeled | Not peeled | Not peeled | Not peeled |
| 30° C. | Appearance | — | 1 | 1 | 1 | 1 | 4 | 4 | 4 | 4 | 4 | 4 |
| | Peeling time (min) | — | 1.5 | 1.5 | 3 | 60 | Not peeled | Not peeled | Not peeled | Not peeled | Not peeled | Not peeled |
| 40° C. | Appearance | — | 4 | 4 | 4 | 4 | 4 | 4 | 4 | 4 | 4 | 4 |
| | Peeling time (min) | — | Not peeled | Not peeled | Not peeled | Not peeled | Not peeled | Not peeled | Not peeled | Not peeled | Not peeled | Not peeled |
| 50° C. | Appearance | — | 4 | 4 | 4 | 4 | 4 | 4 | 4 | 4 | 4 | 4 |
| | Peeling time (min) | — | Not peeled | Not peeled | Not peeled | Not peeled | Not peeled | Not peeled | Not peeled | Not peeled | Not peeled | Not peeled |
| 60° C. | Appearance | — | 4 | 4 | 4 | 4 | 4 | 4 | 4 | 4 | 4 | 4 |
| | Peeling time (min) | — | Not peeled | Not peeled | Not peeled | Not peeled | Not peeled | Not peeled | Not peeled | Not peeled | Not peeled | Not peeled |

Example 3

The preparation of plate glass laminate, appearance and peeling property evaluation after temperature management of plate glass laminate and measurement of glass transition temperature were conducted as in Example 1 except that a photocurable adhering agent having the following components was used. The glass transition temperature of the adhering agent was 34° C. The results are shown in Tables 3-1 to 3-3. Respectively, Table 3-1 shows results of the UV irradiation amount of 1,500 mJ/cm², Table 3-2 shows results of the UV irradiation amount of 3,000 mJ/cm², and Table 3-3 shows results of the UV irradiation amount of 6,000 mJ/cm².

Composition of Photocurable Adhering Agent in Example 3:

As (A) the polyfunctional (meth)acrylates, 10 parts by mass of "UV-3000B" available from The Nippon Synthetic Chemical Industry Co., Ltd. (urethane acrylate, hereinafter abbreviated as "UV-3000B") and 20 parts by mass of trimethylolpropane triacrylate ("Light Acrylate TMP-A" available from Kyoeisha Chemical Co., Ltd., hereinafter abbreviated as "TMP-A");

As (B) the monofunctional (meth)acrylates, 40 parts by mass of 2-(1,2-cyclohexacarboxyimide)ethyl acrylate ("ARONIX M-140" available from TOAGOSEI CO., LTD., hereinafter abbreviated as "M-140") and 30 parts by mass of phenol 2 mol ethylene oxide-modified acrylate ("ARONIX M-101A" available from TOAGOSEI CO., LTD.);

As (C) the photopolymerization initiator, 5 parts by mass of benzyl dimethyl ketal ("IRGACURE 651" available from BASF Company Ltd., hereinafter abbreviated as "BDK");

As (D) the particulate matter, 1 part by mass of spherical crosslinked polystyrene particles with an average particle size of 100 μm ("GS-100S" available from GANZ CHEMICAL CO., LTD.); and As (E) the polymerization inhibitor, 0.1 parts by mass of 2,2-methylene-bis(4-methyl-6-tertiarybutylphenol) ("Sumilizer MDP-S" available from Sumitomo Chemical Company, Limited, hereinafter abbreviated as "MDP").

TABLE 3-1

UV irradiation: 1500 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| Initial stage | Appearance | — | — | — | — | — | — | — | — | — | — | — |
| | Peeling time (min) | 25 | — | — | — | — | — | — | — | — | — | — |

TABLE 3-1-continued

| | | | | | | UV irradiation: 1500 mJ/cm² | | | | | | |
|---|---|---|---|---|---|---|---|---|---|---|---|---|
| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
| −20° C. | Appearance | — | 1 | 1 | 1 | 1 | 1 | 1 | 1 | 1 | 1 | 1 |
| | Peeling time (min) | — | 21 | 22 | 22 | 23 | 24 | 25 | 25 | 25 | 25 | 28 |
| 5° C. | Appearance | — | 1 | 1 | 1 | 1 | 1 | 1 | 1 | 1 | 1 | 1 |
| | Peeling time (min) | — | 21 | 22 | 24 | 26 | 26 | 26 | 26 | 28 | 28 | 29 |
| 10° C. | Appearance | — | 1 | 1 | 1 | 1 | 1 | 1 | 1 | 1 | 1 | 1 |
| | Peeling time (min) | — | 25 | 26 | 26 | 27 | 27 | 32 | 33 | 33 | 33 | 34 |
| 15° C. | Appearance | — | 1 | 1 | 1 | 1 | 1 | 1 | 1 | 1 | 1 | 1 |
| | Peeling time (min) | — | 27 | 30 | 30 | 30 | 31 | 34 | 36 | 36 | 37 | 37 |
| 23° C. | Appearance | — | 1 | 1 | 1 | 1 | 1 | 1 | 1 | 1 | 1 | 1 |
| | Peeling time (min) | — | 30 | 31 | 33 | 34 | 34 | 34 | 34 | 37 | 38 | 40 |
| 30° C. | Appearance | — | 1 | 1 | 1 | 1 | 1 | 1 | 1 | 1 | 3 | 4 |
| | Peeling time (min) | — | 34 | 34 | 34 | 39 | 39 | 39 | 39 | 40 | Not peeled | Not peeled |
| 40° C. | Appearance | — | 1 | 1 | 1 | 1 | 1 | 1 | 1 | 2 | 3 | 4 |
| | Peeling time (min) | — | 36 | 36 | 37 | 40 | 42 | 43 | 45 | Not peeled | Not peeled | Not peeled |
| 50° C. | Appearance | — | 1 | 1 | 1 | 2 | 2 | 2 | 2 | 3 | 4 | 4 |
| | Peeling time (min) | — | 36 | 38 | 39 | 40 | 40 | Not peeled | Not peeled | Not peeled | Not peeled | Not peeled |
| 60° C. | Appearance | — | 1 | 1 | 2 | 3 | 3 | 4 | 4 | 4 | 4 | 4 |
| | Peeling time (min) | — | 36 | 38 | 40 | Not peeled | Not peeled | Not peeled | Not peeled | Not peeled | Not peeled | Not peeled |

TABLE 3-2

| | | | | | | UV irradiation: 3000 mJ/cm² | | | | | | |
|---|---|---|---|---|---|---|---|---|---|---|---|---|
| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
| Initial stage | Appearance | — | — | — | — | — | — | — | — | — | — | — |
| | Peeling time (min) | 10 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 11 | 11 | 11 | 11 | 14 | 15 | 13 | 10 | 9 | 8 |
| 5° C. | Appearance | — | 1 | 1 | 1 | 1 | 1 | 1 | 1 | 1 | 1 | 1 |
| | Peeling time (min) | — | 9 | 11 | 11 | 11 | 12 | 11 | 11 | 11 | 11 | 10 |
| 10° C. | Appearance | — | 1 | 1 | 1 | 1 | 1 | 1 | 1 | 1 | 1 | 1 |
| | Peeling time (min) | — | 9 | 11 | 11 | 11 | 11 | 11 | 11 | 11 | 11 | 13 |
| 15° C. | Appearance | — | 1 | 1 | 1 | 1 | 1 | 1 | 1 | 1 | 1 | 1 |
| | Peeling time (min) | — | 8 | 10 | 11 | 11 | 11 | 11 | 11 | 11 | 11 | 13 |
| 23° C. | Appearance | — | 1 | 1 | 1 | 1 | 1 | 1 | 1 | 1 | 1 | 2 |
| | Peeling time (min) | — | 11 | 12 | 12 | 12 | 12 | 12 | 12 | 12 | 12 | 14 |
| 30° C. | Appearance | — | 1 | 1 | 1 | 1 | 1 | 1 | 2 | 2 | 4 | 4 |
| | Peeling time (min) | — | 11 | 12 | 12 | 12 | 13 | 13 | 14 | 15 | Not peeled | Not peeled |
| 40° C. | Appearance | — | 1 | 1 | 1 | 1 | 2 | 3 | 4 | 4 | 4 | 4 |
| | Peeling time (min) | — | 11 | 12 | 13 | 16 | 20 | 60 | Not peeled | Not peeled | Not peeled | Not peeled |
| 50° C. | Appearance | — | 1 | 1 | 1 | 1 | 3 | 4 | 4 | 4 | 4 | 4 |
| | Peeling time (min) | — | 13 | 13 | 14 | 22 | 45 | Not peeled | Not peeled | Not peeled | Not peeled | Not peeled |
| 60° C. | Appearance | — | 2 | 3 | 4 | 4 | 4 | 4 | 4 | 4 | 4 | 4 |
| | Peeling time (min) | — | 15 | 55 | Not peeled | Not peeled | Not peeled | Not peeled | Not peeled | Not peeled | Not peeled | Not peeled |

TABLE 3-3

| | | | | | | UV irradiation: 6000 mJ/cm² | | | | | | |
|---|---|---|---|---|---|---|---|---|---|---|---|---|
| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
| Initial stage | Appearance | — | — | — | — | — | — | — | — | — | — | — |
| | Peeling time (min) | 3 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 3 | 3.5 | 3.5 | 4 | 4 | 5 | 3 | 3 | 2 | 2 |

TABLE 3-3-continued

UV irradiation: 6000 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| 5° C. | Appearance | — | 1 | 1 | 1 | 1 | 1 | 1 | 1 | 1 | 1 | 1 |
| | Peeling time (min) | — | 3 | 3.5 | 4 | 4 | 4 | 4.5 | 4.5 | 2 | 2 | 2 |
| 10° C. | Appearance | — | 1 | 1 | 1 | 1 | 1 | 1 | 1 | 1 | 1 | 1 |
| | Peeling time (min) | — | 3 | 3.5 | 4 | 4 | 4 | 4.5 | 4.5 | 5 | 5 | 3 |
| 15° C. | Appearance | — | 1 | 1 | 1 | 1 | 1 | 1 | 1 | 1 | 1 | 2 |
| | Peeling time (min) | — | 8 | 9 | 9 | 9 | 9 | 9 | 10 | 10 | 10 | 10 |
| 23° C. | Appearance | — | 1 | 1 | 1 | 1 | 1 | 1 | 1 | 1 | 2 | 2 |
| | Peeling time (min) | — | 8 | 9 | 9 | 9 | 9 | 9 | 10 | 10 | 11 | 11 |
| 30° C. | Appearance | — | 1 | 1 | 1 | 1 | 1 | 1 | 2 | 2 | 4 | 4 |
| | Peeling time (min) | — | 8 | 9 | 9 | 9 | 9 | 9 | 10 | 11 | Not peeled | Not peeled |
| 40° C. | Appearance | — | 1 | 1 | 2 | 3 | 4 | 4 | 4 | 4 | 4 | 4 |
| | Peeling time (min) | — | 8 | 10 | 14 | 21 | 25 | 40 | 60 | Not peeled | Not peeled | Not peeled |
| 50° C. | Appearance | — | 1 | 1 | 3 | 4 | 4 | 4 | 4 | 4 | 4 | 4 |
| | Peeling time (min) | — | 8 | 10 | 17 | 60 | Not peeled | Not peeled | Not peeled | Not peeled | Not peeled | Not peeled |
| 60° C. | Appearance | — | 1 | 4 | 4 | 4 | 4 | 4 | 4 | 4 | 4 | 4 |
| | Peeling time (min) | — | 8 | 15 | 60 | Not peeled | Not peeled | Not peeled | Not peeled | Not peeled | Not peeled | Not peeled |

Example 4

The preparation of plate glass laminate, appearance and peeling property evaluation after temperature management of plate glass laminate and measurement of glass transition temperature were conducted as in Example 1 except that a photocurable adhering agent having the following components was used. The glass transition temperature of the adhering agent was 29° C. The results are shown in Tables 4-1 to 4-3. Respectively, Table 4-1 shows results of the UV irradiation amount of 1,500 mJ/cm², Table 4-2 shows results of the UV irradiation amount of 3,000 mJ/cm², and Table 4-3 shows results of the UV irradiation amount of 6,000 mJ/cm².

Composition of Photocurable Adhering Agent in Example 4:

As (A) the polyfunctional (meth)acrylates, 20 parts by mass of "UV-3000B" available from The Nippon Synthetic Chemical Industry Co., Ltd. (urethane acrylate, hereinafter abbreviated as "UV-3000B") and 25 parts by mass of dicyclopentanyl diacrylate ("KAYARAD R-684" available from Nippon Kayaku Co., Ltd., hereinafter abbreviated as "R-684");

As (B) the monofunctional (meth)acrylates, 35 parts by mass of 2-hydroxy-3-phenoxypropyl (meth)acrylate ("ARONIX M-5700" available from TOAGOSEI CO., LTD., hereinafter abbreviated as "M-5700") and 20 parts by mass of phenol 2 mol ethylene oxide-modified acrylate ("ARONIX M-101A" available from TOAGOSEI CO., LTD.);

As (C) the photopolymerization initiator, 10 parts by mass of benzyl dimethyl ketal ("IRGACURE 651" available from BASF Company Ltd., hereinafter abbreviated as "BDK");

As (D) the particulate matter, 1 part by mass of spherical crosslinked polystyrene particles with an average particle size of 100 μm ("GS-100S" available from GANZ CHEMICAL CO., LTD.); and As (E) the polymerization inhibitor, 0.1 parts by mass of 2,2-methylene-bis(4-methyl-6-tertiarybutylphenol) ("Sumilizer MDP-S" available from Sumitomo Chemical Company, Limited, hereinafter abbreviated as "MDP").

TABLE 4-1

UV irradiation: 3000 mJ/cm²

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| Initial stage | Appearance | — | — | — | — | — | — | — | — | — | — | — |
| | Peeling time (min) | 3 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 3 | 3 | 3 | 3 | 3 | 3 | 2 | 2 | 3 | 2 |
| 5° C. | Appearance | — | 1 | 1 | 1 | 1 | 1 | 1 | 1 | 1 | 1 | 1 |
| | Peeling time (min) | — | 2 | 3 | 3 | 3 | 3 | 3 | 2 | 2.5 | 2.5 | 3 |
| 10° C. | Appearance | — | 1 | 1 | 1 | 1 | 1 | 1 | 1 | 1 | 1 | 1 |
| | Peeling time (min) | — | 2 | 3 | 3 | 2 | 2 | 3 | 2 | 3 | 3 | 3 |
| 15° C. | Appearance | — | 1 | 1 | 1 | 1 | 1 | 1 | 1 | 1 | 1 | 1 |
| | Peeling time (min) | — | 2 | 2 | 2 | 3 | 3 | 3 | 3 | 4 | 4 | 4 |
| 23° C. | Appearance | — | 1 | 1 | 1 | 1 | 1 | 1 | 1 | 1 | 2 | 2 |
| | Peeling time (min) | — | 2 | 2 | 2.5 | 3 | 3 | 3 | 4 | 5 | 10 | 30 |
| 30° C. | Appearance | — | 1 | 1 | 1 | 2 | 3 | 3 | 4 | 4 | 4 | 4 |
| | Peeling time (min) | — | 3 | 3 | 3 | 5 | 10 | 15 | Not peeled | Not peeled | Not peeled | Not peeled |

TABLE 4-1-continued

| | | | UV irradiation: 3000 mJ/cm² | | | | | | | | | |
|---|---|---|---|---|---|---|---|---|---|---|---|---|
| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
| 40° C. | Appearance | — | 1 | 1 | 2 | 3 | 4 | 4 | 4 | 4 | 4 | 4 |
| | Peeling time (min) | — | 3 | 3 | 3 | 10 | 60 | Not peeled | Not peeled | Not peeled | Not peeled | Not peeled |
| 50° C. | Appearance | — | 1 | 2 | 3 | 3 | 4 | 4 | 4 | 4 | 4 | 4 |
| | Peeling time (min) | — | 3 | 3 | 3 | 50 | Not peeled | Not peeled | Not peeled | Not peeled | Not peeled | Not peeled |
| 60° C. | Appearance | — | 1 | 2 | 3 | 4 | 4 | 4 | 4 | 4 | 4 | 4 |
| | Peeling time (min) | — | 3 | 3.5 | 40 | Not peeled | Not peeled | Not peeled | Not peeled | Not peeled | Not peeled | Not peeled |

TABLE 4-2

| | | | UV irradiation: 3000 mJ/cm² | | | | | | | | | |
|---|---|---|---|---|---|---|---|---|---|---|---|---|
| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
| Initial stage | Appearance | — | — | — | — | — | — | — | — | — | — | — |
| | Peeling time (min) | 3 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 3 | 3 | 3 | 3 | 3 | 3 | 2 | 2 | 3 | 2 |
| 5° C. | Appearance | — | 1 | 1 | 1 | 1 | 1 | 1 | 1 | 1 | 1 | 1 |
| | Peeling time (min) | — | 2 | 3 | 3 | 3 | 3 | 3 | 2 | 2.5 | 2.5 | 3 |
| 10° C. | Appearance | — | 1 | 1 | 1 | 1 | 1 | 1 | 1 | 1 | 1 | 1 |
| | Peeling time (min) | — | 2 | 3 | 3 | 2 | 2 | 3 | 2 | 3 | 3 | 3 |
| 15° C. | Appearance | — | 1 | 1 | 1 | 1 | 1 | 1 | 1 | 1 | 1 | 1 |
| | Peeling time (min) | — | 2 | 2 | 2 | 3 | 3 | 3 | 3 | 4 | 4 | 4 |
| 23° C. | Appearance | — | 1 | 1 | 1 | 1 | 1 | 1 | 1 | 1 | 2 | 2 |
| | Peeling time (min) | — | 2 | 2 | 2.5 | 3 | 3 | 3 | 4 | 5 | 10 | 30 |
| 30° C. | Appearance | — | 1 | 1 | 1 | 2 | 3 | 3 | 4 | 4 | 4 | 4 |
| | Peeling time (min) | — | 3 | 3 | 3 | 5 | 10 | 15 | Not peeled | Not peeled | Not peeled | Not peeled |
| 40° C. | Appearance | — | 1 | 1 | 2 | 3 | 4 | 4 | 4 | 4 | 4 | 4 |
| | Peeling time (min) | — | 3 | 3 | 3 | 10 | 60 | Not peeled | Not peeled | Not peeled | Not peeled | Not peeled |
| 50° C. | Appearance | — | 1 | 2 | 3 | 3 | 4 | 4 | 4 | 4 | 4 | 4 |
| | Peeling time (min) | — | 3 | 3 | 3 | 50 | Not peeled | Not peeled | Not peeled | Not peeled | Not peeled | Not peeled |
| 60° C. | Appearance | — | 1 | 2 | 3 | 4 | 4 | 4 | 4 | 4 | 4 | 4 |
| | Peeling time (min) | — | 3 | 3.5 | 40 | Not peeled | Not peeled | Not peeled | Not peeled | Not peeled | Not peeled | Not peeled |

TABLE 4-3

| | | | UV irradiation: 6000 mJ/cm² | | | | | | | | | |
|---|---|---|---|---|---|---|---|---|---|---|---|---|
| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
| Initial stage | Appearance | — | — | — | — | — | — | — | — | — | — | — |
| | Peeling time (min) | 1 | — | — | — | — | — | — | — | — | — | — |
| −20° C. | Appearance | — | 1 | 1 | 1 | 1 | 1 | 1 | 1 | 1 | 1 | 1 |
| | Peeling time (min) | — | 1 | 1 | 1 | 1 | 1 | 1 | 1 | 1 | 1 | 1 |
| 5° C. | Appearance | — | 1 | 1 | 1 | 1 | 1 | 1 | 1 | 1 | 1 | 2 |
| | Peeling time (min) | — | 1 | 1 | 1 | 1 | 1 | 1 | 1 | 1 | 1 | 1 |
| 10° C. | Appearance | — | 1 | 1 | 1 | 1 | 1 | 1 | 1 | 1 | 1 | 2 |
| | Peeling time (min) | — | 1 | 1 | 1 | 1 | 1 | 1 | 1 | 1 | 1 | 1 |
| 15° C. | Appearance | — | 1 | 1 | 1 | 1 | 1 | 1 | 1 | 1 | 1 | 2 |
| | Peeling time (min) | — | 1 | 1 | 1 | 1 | 1 | 1 | 1 | 1.5 | 3 | 9.5 |
| 23° C. | Appearance | — | 1 | 1 | 1 | 1 | 1 | 1 | 1 | 2 | 2 | 4 |
| | Peeling time (min) | — | 1 | 1 | 1 | 1 | 1 | 1 | 2.5 | 2.5 | 3 | Not peeled |
| 30° C. | Appearance | — | 1 | 1 | 1 | 3 | 3 | 4 | 4 | 4 | 4 | 4 |
| | Peeling time (min) | — | 1.5 | 1.5 | 8 | 40 | 60 | Not peeled | Not peeled | Not peeled | Not peeled | Not peeled |
| 40° C. | Appearance | — | 1 | 1 | 3 | 4 | 4 | 4 | 4 | 4 | 4 | 4 |
| | Peeling time (min) | — | 1.5 | 2 | 40 | Not peeled | Not peeled | Not peeled | Not peeled | Not peeled | Not peeled | Not peeled |

TABLE 4-3-continued

UV irradiation: 6000 mJ/cm$^2$

| Management temperature | | Initial stage | 4 hours later | 16 hours later | 40 hours later | 90 hours later | 170 hours later | 2 weeks later | 3 weeks later | 4 weeks later | 6 weeks later | 8 weeks later |
|---|---|---|---|---|---|---|---|---|---|---|---|---|
| 50° C. | Appearance | — | 1 | 4 | 4 | 4 | 4 | 4 | 4 | 4 | 4 | 4 |
| | Peeling time (min) | — | 2 | Not peeled | Not peeled | Not peeled | Not peeled | Not peeled | Not peeled | Not peeled | Not peeled | Not peeled |
| 60° C. | Appearance | — | 1 | 4 | 4 | 4 | 4 | 4 | 4 | 4 | 4 | 4 |
| | Peeling time (min) | — | 2 | Not peeled | Not peeled | Not peeled | Not peeled | Not peeled | Not peeled | Not peeled | Not peeled | Not peeled |

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method of processing a translucent rigid substrate laminate comprising:
  a step 1 for producing a translucent rigid substrate laminate in which at least two translucent rigid substrates are bonded to each other with a photocurable adhering agent;
  a step 2 for maintaining the translucent rigid substrate laminate, which has been produced in step 1 or which has been subjected to shape processing subsequent to step 1, under the following temperature management conditions and transporting and/or storing the translucent rigid substrate laminate while maintaining the translucent rigid substrate laminate under the conditions of
    1) 10 hours to 4 weeks when the translucent rigid substrate laminate is maintained at a management temperature lower than a glass transition temperature of a cured body of the photocurable adhering agent by 0° C. or more and less than 5° C.,
    2) 10 hours to 6 weeks when the translucent rigid substrate laminate is maintained at a management temperature lower than the glass transition temperature of a cured body of the photocurable adhering agent by 5° C. or more and less than 10° C., and
    3) 10 hours to 8 weeks when the translucent rigid substrate laminate is maintained at a management temperature lower than a glass transition temperature of a cured body of the photocurable adhering agent by 10° C. or more; and
  a step 3 for peeling the translucent rigid substrate laminate which has been subjected to the shape processing or has not been subjected to the shape processing subsequent to step 2.

2. The method of processing a translucent rigid substrate laminate according to claim 1,
  wherein an amount of light irradiation to cure the adhering agent every time the translucent rigid substrates are bonded in step 1 is 100 to 10,000 mJ/cm$^2$.

3. The method of processing a translucent rigid substrate laminate according to claim 2,
  wherein light irradiation is performed on the translucent rigid substrate laminate before the peeling in step 3 subsequent to the step 2 to cure the adhering agent.

4. The method of processing a translucent rigid substrate laminate according to claim 2,
  wherein the translucent rigid substrate is a plate glass.

5. The method of processing a translucent rigid substrate laminate according to claim 2,
  wherein the adhering agent contains (A) polyfunctional (meth)acrylate, (B) monofunctional (meth)acrylate, and (C) photopolymerization initiator.

6. A process of manufacturing a plate-shaped product using the method of processing a translucent rigid substrate laminate according to claim 2.

7. The method of processing a translucent rigid substrate laminate according to claim 1,
  wherein light irradiation is performed on the translucent rigid substrate laminate before the peeling in step 3 subsequent to the step 2 to cure the adhering agent.

8. The method of processing a translucent rigid substrate laminate according to claim 7,
  wherein the translucent rigid substrate is a plate glass.

9. The method of processing a translucent rigid substrate laminate according to claim 7,
  wherein the adhering agent contains (A) polyfunctional (meth)acrylate, (B) monofunctional (meth)acrylate, and (C) photopolymerization initiator.

10. A process of manufacturing a plate-shaped product using the method of processing a translucent rigid substrate laminate according to claim 7.

11. The method of processing a translucent rigid substrate laminate according to claim 1,
  wherein the translucent rigid substrate is a plate glass.

12. The method of processing a translucent rigid substrate laminate according to claim 11,
  wherein the adhering agent contains (A) polyfunctional (meth)acrylate, (B) monofunctional (meth)acrylate, and (C) photopolymerization initiator.

13. A process of manufacturing a plate-shaped product using the method of processing a translucent rigid substrate laminate according to claim 11.

14. The method of processing a translucent rigid substrate laminate according to claim 1,
  wherein the adhering agent contains (A) polyfunctional (meth)acrylate, (B) monofunctional (meth)acrylate, and (C) photopolymerization initiator.

15. The method of processing a translucent rigid substrate laminate according to claim 14,
  wherein the adhering agent contains (D) a particulate matter.

16. The method of processing a translucent rigid substrate laminate according to claim 15,
  wherein the adhering agent contains (E) a polymerization inhibitor.

17. A process of manufacturing a plate-shaped product using the method of processing a translucent rigid substrate laminate according to claim 15.

18. The method of processing a translucent rigid substrate laminate according to claim 14, wherein the adhering agent contains (E) a polymerization inhibitor.

19. A process of manufacturing a plate-shaped product using the method of processing a translucent rigid substrate laminate according to claim 14.

20. A process of manufacturing a plate-shaped product using the method of processing a translucent rigid substrate laminate according to claim 1.

\* \* \* \* \*